United States Patent [19]
Conway

[11] Patent Number: 4,470,915
[45] Date of Patent: Sep. 11, 1984

[54] METHOD AND COMPOSITIONS FOR FRACTURING SUBTERRANEAN FORMATIONS

[75] Inventor: Michael W. Conway, Duncan, Okla.

[73] Assignee: Halliburton Company, Duncan, Okla.

[21] Appl. No.: 423,576

[22] Filed: Sep. 27, 1982

[51] Int. Cl.$^3$ .............................................. E21B 43/26
[52] U.S. Cl. ................ 252/8.55 R; 166/308; 252/315.3
[58] Field of Search ............. 252/8.55 R, 8.55 C, 252/315.3; 166/308

[56] References Cited

U.S. PATENT DOCUMENTS 3,888,312  6/1975  Tiner et al. ................ 166/308
3,898,165  8/1975  Ely et al. .................. 252/8.55
4,110,230  8/1978  Hessert et al. ............. 252/8.55

FOREIGN PATENT DOCUMENTS 793760  4/1958  United Kingdom .

OTHER PUBLICATIONS

Paul Lagally and Herta Lagally, "Atomistic Approach to the Crosslinking of Cellulose Fibers and Their Reaction with Fillers", TAPPI, vol. 39, No. 11, pp. 747–754, 1956.

Primary Examiner—Herbert B. Guynn
Attorney, Agent, or Firm—Robert A. Kent; Thomas R. Weaver

[57] ABSTRACT

An aqueous gel containing a crosslinking agent comprising an organotitanate chelate and a retarding agent which delays crosslinking of the gel. This retarding agent comprises a selected polyhydroxycarboxylic acid having from 3 to 7 carbon atoms. The gel is useful for fracturing and placing propping agents within a subterranean formation. The gel has a high viscosity in the formation and has pumping characteristics in turbulent flow similar to those of water.

18 Claims, No Drawings

METHOD AND COMPOSITIONS FOR FRACTURING SUBTERRANEAN FORMATIONS

BACKGROUND OF THE INVENTION

1. Field of the Invention

This invention relates to methods and compositions for the hydraulic fracturing of subterranean formations. It more particularly relates to methods and compositions for fracturing a subterranean formation penetrated by a well bore wherein a fluid composition having retarded crosslinking properties is injected into a formation through a suitable conduit at a rate and pressure sufficient to produce a fracture in the formation.

2. Brief Description of the Prior Art

In the drilling, completion and treatment of subterranean formations penetrated by well bores, viscous treating fluids commonly are utilized. In such operations, it often is desirable or necessary that the viscous treating fluids have relatively low initial viscosities, but when placed in the well bore or subterranean formation to be treated, the viscosities of the fluids increase. For example, in performing a subterranean fracturing process on a hydrocarbon-bearing formation to stimulate the production of hydrocarbons therefrom, a treating fluid which has a low viscosity and a low friction pressure when being pumped but which exhibits a high viscosity in the formation is desirable.

Generally, in the art of hydraulic fracturing, a fluid is introduced through a conduit, such as tubing or casing, disposed in the well bore into a formation sought to be fractured. The fluid is introduced at a rate and pressure sufficient to produce a fracture or fractures in the formation and to extend the produced fracture or fractures from the well bore into the formation. Upon the creation of the fracture or fractures, additional fracturing fluid containing solid proppant materials can be introduced into the fracture or fractures in the event the initial fluid did not contain any proppant. Following this treatment, the introduced fluid is recovered from the formation, but the proppant remains in the produced fracture or fractures to thereby prevent the complete closure thereof. The propped fracture creates a conductive channel extending from the well bore into the formation.

The conductivity of a propped fracture is effected by the particle size of the proppant material placed in the fracture. The particle size of the proppant that can be used depends upon the width to which the particular fracture can be opened during the introduction of the fracturing fluid. The fracture width normally is directly proportional to the viscosity of the fracturing fluid. In addition, the use of fracturing fluids having relatively high viscosities is advantageous since such fluids can support the proppant particles suspended therein without excessive settling. The use of such high viscosity fluids also permits the placement of relatively large-size proppant material in the fracture without a screenout occurring, that is, without the proppant bridging across the mouth of the fracture and preventing the introduction of proppant therein.

The use of desirably high viscosity fracturing fluids undesirably is accompanied by the problem of high friction losses usually encountered during the introduction of such fluids into a formation through the conduit, such as tubing or casing, disposed in the well bore. Since the pumping equipment and tubular goods are limited in capacity and operating pressure, the viscosity of the fluid which can be pumped also is limited. The viscosity of the fluid must be low enough that excessive friction losses and high well head pumping pressures are not encountered.

SUMMARY OF THE INVENTION

By the present invention there are provided methods of forming and using an improved viscous treating fluid. The treating fluid has an initial viscosity such that solid proppants can be suspended therein and carried thereby without excessive settling, but the viscosity of the fluid is not so high that excessive friction losses are encountered in pumping the fluid. Thus, according to this invention, an aqueous gel is provided which contains a crosslinking agent capable of crosslinkiing the gelling agent in the aqueous fluid to produce a fluid of significantly higher viscosity and a retarding agent which delays the action of the crosslinking agent upon the gelling agent.

BRIEF DESCRIPTION OF THE PREFERRED EMBODIMENT

In accordance with the present invention an aqueous gel is provided comprising an aqueous fluid, a gelling agent, a crosslinking agent soluble in the aqueous fluid and a retarding agent capable of delaying the rate of the crosslinking reaction. The aqueous gel has a non-Newtonian viscosity in laminar flow, such as in subterranean formations, of from about 100 centipoise to in excess of 1,000 centipoise at 170 sec$^{-1}$ shear rate. However, during introduction of the aqueous gel into the formation through a conduit in which the fluid is in turbulent flow, the viscosity is no greater than that imparted by the gelling agent before crosslinking. The aqueous gel of the present invention can carry great quantities of proppants into a formation sought to be fractured and can be introduced into the formation at suitably high rates with pumping equipment and tubular goods normally available at the wellhead.

The aqueous fluid utilized herein is defined as a water-alcohol solution having from about 0 to 80 percent and preferably from about 0 to 40 percent and most preferably from about 0 to 10 percent alcohol by volume of the solution. The preferred alcohols are alkanols having from 1 to 5 carbon atoms. Examples of alcohols believed to be useful in the aqueous fluid include methanol, ethanol, propanol, isopropanol, butanol, isobutanol, pentanol, furfuryl alcohol, ethylene glycol, and ethoxylated derivatives thereof.

The aqueous fluid is used to solvate the gelling agent. The solvated gelling agent is referred to hereinafter as a "base gel". The pH of the aqueous fluid can be adjusted, if necessary, to render the fluid compatible with the crosslinking agent used to crosslink the solvated gelling agent. The pH adjusting material can be added to the aqueous fluid before, after, or during addition of the gelling agent to the aqueous fluid.

The gelling agent useful in the present invention is selected from solvatable polysaccharides having molecular weights of at least 100,000. Examples of polysaccharides useful herein include the galactomannan gums, glucomannan gums, and their derivatives. Solvatable galactomannan and glucomannan gums are naturally occurring. The galactomannan gums and glucomannan gums also can be reacted with hydrophilic constituents to thereby produce gelling agents useful herein.

Solvatable polysaccharides having molecular weights of less than about 100,000 do not form crosslinked gels which are useful herein. The most preferred solvatable polysaccharides useful herein have molecular weights in the range of from about 200,000 to about 3,000,000.

Guar gum, locust bean gum, karaya gum, sodium carboxymethylguar, hydroxyethylguar, sodium carboxymethylhydroxyethylguar, hydroxypropylguar and sodium carboxymethylhydroxypropylguar, are examples of gelling agents useful herein.

The preferred gelling agents are guar gum, hydroxypropylguar and sodium carboxymethylhydroxypropylguar. The most preferred gelling agent is hydroxypropylguar.

The gelling agent useful herein is present in the aqueous fluid in a concentration in the range of from about 0.2 to about 1.25 percent, preferably from about 0.2 to about 1.0 percent and most preferably from about 0.4 to about 0.7 percent by weight of the aqueous fluid. A gelling agent concentration of less than about 0.2 percent by weight of the aqueous fluid is not a sufficient quantity of gelling agent to permit effective crosslinking of the gel within the formation.

The crosslinking compounds of the present invention feature the presence of titanium in the +4 oxidation state and are referred to as organotitanate chelates. An example of an organotitanate chelate useful herein is titanium-triethanolamine chelate. Yet another example of an organotitanate chelate useful herein is titanium-acetylacetonate chelate. Titanium-triethanolamine chelate and titanium-acetylacetonate chelate also are available from E. I. duPont de Nemours and Company, Inc. under the trademarks TYZOR®TE and TYZOR®AA, respectively.

The crosslinking mechanism is not fully understood. However, it is believed that the titanium does not experience any sort of valence change during the crosslinking reaction.

The amount of crosslinking agent useful to crosslink the gelling agent of this invention is that which provides a titanium ion concentration in the range of from about 0.0005 percent to in excess of about 0.01 percent by weight of the aqueous fluid. The preferred concentration is in the range of from about 0.0015 percent to about 0.01 percent by weight and, most preferably, from about 0.003 percent to about 0.006 percent by weight of the aqueous fluid. It is convenient, and thus preferred, to admix the base gel with a solution of the crosslinking agent. The solution is, broadly, any aqueous solution which does not adversely react with the gelling agent, crosslinking agent, or retarding agent to prevent the formation of the aqueous gel of the invention. Convenient crosslinking agent solutions are in the range of from about 0.05 percent to about 50 percent of crosslinking agent by weight of solution. Appropriate calculations then are required, based upon the solution concentrations, to determine the quantity of solution necessary to provide the desired quantity of crosslinking agent in the aqueous gel.

The rate of the crosslinking reaction is extremely rapid. At ambient temperature conditions, the organotitanate chelates comprising the crosslinking agent can crosslink the polysaccharides comprising the gelling agent in as little as 10 to 15 seconds. When the aqueous fluid of the base gel is maintained at an elevated temperature, such as when preheated solutions are employed having a temperature above 100° F., the crosslinking reaction occurs almost instantaneously upon introduction of the crosslinking agent into the base gel. Such rapid reaction rates do not permit the gelled fluid to be pumped into the subterranean formation before a significant increase in the viscosity of the fluid occurs.

The discovery now has been made that the introduction of a selected retarding agent to the base gel prior to admixing the base gel and crosslinking agent will provide a controllable delay in the rate of the crosslinking reaction. This retarded aqueous gel readily can be introduced through a conduit into a subterranean formation sought to be fractured as a result of its relatively low initial viscosity. The surprising discovery also has been made that admixing the crosslinking agent with an aqueous fluid and the retarding agent in predetermined amounts produces a composition which can be used to delay the rate of the crosslinking reaction for a period of time sufficient to permit pumping of the aqueous gel through the conduit to the subterranean formation. Typically, this time can be from several minutes to hours in extremely deep formations. The significant increase in the viscosity of the gel through crosslinking as it reaches the lower portion of the conduit or upon entry into the formation facilitates the fracturing process through a reduction in the hydraulic horsepower necessary to effect the fracture.

The retarding agent useful in the present invention is at least one member selected from the group consisting of polyhydroxycarboxylic acids having from 3 to 7 carbon atoms. Examples of polyhydroxycarboxylic acids useful herein include citric acid, malic acid, succinic acid, tartaric acid, glucuronic acid, gluconic acid, ascorbic acid, alpha-keto glutaric acid, isoascorbic acid, and the like. The retarding agent can be in solid or liquid form when introduced into the aqueous fluid of the present invention.

The retarding agent useful herein is admixed with the aqueous fluid in an amount sufficient to provide a controlled delay in the crosslinking rate of the base gel when admixed with the crosslinking agent. The retarding agent can be used to delay the rate of the crosslinking reaction for a period of time sufficient to permit pumping of the aqueous gel through the conduit to the subterranean formations. The particular amount of retarding agent necessary to delay the crosslinking reaction will depend upon the specific gelling agent and crosslinking agent utilized as well as the equipment available at the wellhead and tubular goods which will affect the pumping rate of the aqueous gel into the formation. When the retarding agent is admixed with the base gel, preferably a liquid form of the retarding agent is employed, such as an aqueous solution, to facilitate mixing in the base gel.

Conventional propping agents can be employed with the fracturing fluid compositions of the present invention, examples of which are quartz sand grains, tempered glass beads, rounded walnut shell fragments, aluminum pellets, sintered bauxite, nylon pellets, and similar materials. Propping agents generally are used in concentrations in the range of from about 1 to about 10 pounds per gallon of the aqueous fluid; however, higher or lower concentrations may be used as required. The particle size of the propping agent employed is a function of the nature of the formation to be fractured, the pressure required to produce the fracture, and pumping fluid flow rates available, as well as other known factors. However, particle sizes in the range of from about 200 to about 2 mesh on the U.S. Sieve Series scale can be employed in fracturing well formations with the compositions of the present invention.

In one embodiment, the aqueous gel of the present invention can be prepared for use by mixing a predetermined quantity of the solvatable polysaccharide gelling agent and the retarding agent with a quantity of aqueous fluid to form a solvated gel. In the event the retarding agent is not added during solvation of the gelling agent, preferably the retarding agent that is mixed with the base gel is in the form of an aqueous solution to facilitate mixing. Any conventional batch mixing apparatus can be employed for this purpose. After the gelling agent, retarding agent and aqueous fluid have been mixed for a time sufficient to dissolve the retarding agent and form the base gel, a quantity of the crosslinking agent is mixed with the gel. The mixture then is pumped into the wellbore and into the formation as the retarded crosslinking reaction takes place. Proppant generally is added to the base gel prior to addition of the crosslinking agent as the gel is introduced into the wellbore.

In an alternate embodiment of the invention, a retarded crosslinking composition is prepared by admixing the crosslinking agent, retarding agent and an aqueous fluid in predetermined amounts. The aqueous fluid utilized to formulate the retarded complexing composition can comprise substantially any aqueous solution which does not adversely react with the gelling agent, crosslinking agent or retarding agent. Preferably, the aqueous fluid comprises water. The constituents are admixed in a volumetric ratio of crosslinking agent to retarding agent to aqueous fluid in the range of from about 1:0.05:0.05 to about 1:10:10. Preferably, the ratio is in the range of from about 1:0.1:0.1 to about 1:4:4; and, most preferably, the ratio is about 1:0.5:0.5 to about 1:2:2. The constituents of the retarded crosslinking composition can be admixed in any order in any conventional mixing apparatus, such as for example, a batch mixer. When an aqueous-containing solution of the crosslinking compound is utilized, the aqueous portion is included in determining the total aqueous fluid content of the retarded crosslinking composition.

Surprisingly, it has been found that the high temperature rheological properties of the aqueous gels formed with the retarded crosslinking composition of the present invention improve when the retarded crosslinking composition is "aged" prior to use. The term "aged" as used herein is intended to mean that the admixture comprising the retarded crosslinking composition is held in the appropriate container after formulation for a period of from a few minutes to over several weeks prior to use. Preferably, the retarded crosslinking composition is aged for from about 2 to about 4 weeks at 80° F. It has been found that when the retarded crosslinking composition is aged at a generally constant temperature, the initial crosslinking reaction rate declines while the high temperature viscosity of an aqueous gelled fluid crosslinked with the retarded crosslinking composition increases. When the retarded crosslinking composition is aged at a temperature above ambient, such as, an elevated temperature such as from about 80° F. to about 180° F., the rate of decline in the initial crosslinking reaction rate and rate of increase in the high temperature viscosity of the aqueous gelled fluid are enhanced. This permits the production of retarded crosslinking compositions having preselected properties by controlling the time and temperature of the aging.

The aqueous gel of this embodiment of the present invention then can be prepared for use by mixing a predetermined quantity of the solvatable polysaccharide gelling agent with a quantity of aqueous fluid to form a solvated gel. Any conventional batch mixing apparatus can be employed for this purpose. After the gelling agent and aqueous fluid have been mixed for a time sufficient to dissolve the gelling agent and form the base gel, a quantity of the retarded crosslinking composition is mixed with the gel. The mixture then is pumped into the wellbore and into the formation as the retarded crosslinking reaction takes place. Proppant generally is added to the base gel prior to addition of the retarded crosslinking composition as the gel is introduced into the wellbore.

The aqueous gel of this invention can be made over a wide pH range and be useful for fracturing subterranean formations. The rate at which the crosslinking reaction proceeds at normal temperatures (about 60° F. to about 120° F.) in the absence of the retarding agent is a function of the pH of the base gel. The pH of the aqueous gel of this invention also has been found to affect the crosslinking rate but to a lesser extent which is believed to result from some type of a buffering effect or the like provided by the retarding agent. To assure that the crosslinking reaction takes place in the desired period of time, the pH of the aqueous fluid or of the base gel can be adjusted to a desired level within the range of from about pH 5 to about 10.5 and, preferably, to a level within the range of from about 6 to about 8 by the addition of a pH adjusting chemical. Since water from most sources is substantially neutral, the chemical or chemicals used for this purpose can be acids, acid buffers, mixtures thereof, or mixtures of acids and bases. Examples of suitable acids are hydrochloric acid, formic acid, acetic acid, fumaric acid, and phthalic acid. Examples of suitable buffers are potassium biphthalate, sodium hydrogen fumarate, and sodium bicarbonate. Examples of mixtures of acids and bases are fumaric acid and sodium fumarate, adipic acid and sodium bicarbonate, and fumaric acid and sodium carbonate.

One process for fracturing a subterranean formation penetrated by a well bore comprises injecting down the well bore and into the formation, at a pressure sufficient to fracture the formation, a fluid comprising an aqueous gel which is prepared by adding from about 30 to about 70 pounds of gelling agent comprising hydroxypropylguar to each 1,000 gallons of aqueous fluid containing about 0 to about 10 percent by volume methanol. During addition of the gelling agent from about 0.1 pounds to about 10 pounds of the retarding agent comprising citric acid is added to each 1,000 gallons of the aqueous fluid. If desired, the pH of the aqueous fluid first can be adjusted by the addition of a sufficient quantity of a buffering agent such as fumaric acid, formic acid or sodium bicarbonate. The base gel is introduced into the well bore and, as it is introduced, a sand proppant is introduced in an amount of from about 1 pound to about 8 pounds per gallon and the crosslinking agent then is introduced. The crosslinking agent is comprised of various commercially available organotitanate chelates or aqueous-alcohol dilutions thereof and is introduced at the rate of 0.025 to 0.5 gallon per each 10 pounds of gelling agent per each 1,000 gallons of aqueous fluid.

Another process for fracturing a subterranean formation penetrated by a well bore comprises injecting down the well bore and into the formation, at a pressure sufficient to fracture the formation, a fluid comprising an aqueous gel which is prepared by adding from about 30 to about 70 pounds of gelling agent comprising hydroxypropylguar to each 1,000 gallons of aqueous fluid containing about 0 to about 10 percent by volume methanol. If desired, the pH of the aqueous fluid can be adjusted by the addition of a sufficient quantity of a buffering agent such as fumaric acid, formic acid or sodium bicarbonate. The base gel is introduced into the well bore and, as it is introduced, a sand proppant is introduced in an amount of from about 1 pound to about 8 pounds per gallon and the retarded crosslinking composition then is introduced. The retarded crosslinking composition is comprised of an admixture of the various commercially available organotitanate chelates or aqueous-alcohol dilutions thereof, the retarding agent and an aqueous fluid in a ratio of about 1:1:1 to about 1:4:4 which is aged for at least about 30 minutes at 80° F. The aged retarded crosslinking composition is introduced at the rate of 0.1 to 1.0 gallon per each 10 pounds of gelling agent per each 1,000 gallons of aqueous fluid.

After the aqueous gel has been pumped into the subterranean formation and a fracture has been formed, it is desirable to convert the gel into a low viscosity fluid so that it can be recovered from the formation through the well bore. This conversion often is referred to as "breaking" the gel. There are various methods available for breaking the aqueous gel of the present invention. The gels of the present invention break after either or both the passage of time and prolonged exposure to high temperatures. However, it is desirable to be able to predict breaking time within relatively narrow limits. Therefore, breakers optionally can be included in the crosslinked gel of the present invention. Mild oxidizing agents are useful as breakers when a gel is used in relatively high temperature formation, although formation temperatures of 200° F. or greater will generally break the gel relatively quickly without the aid of an oxidizing agent. A suitable oxidizing agent is ammonium or sodium persulfate or various organic hydroperoxides. For crosslinked gels used at temperatures below about 140° F., enzymes are generally used as breakers. Suitable enzymes for such use are alpha and beta amylases, amyloglucosidase, oligoglucosidase, invertase, maltase, cellulase, and hemicellulase.

To further illustrate the present invention, the following examples are provided. It is to be understood that the examples are not intended to limit the scope of this invention.

EXAMPLE I

A retarded crosslinking composition is prepared in accordance with the present invention containing 91.25 gm. titanium-triethanolamine chelate, 44 gm. of a retarding agent comprising ascorbic acid and 91.25 gm. of water. This composition is permitted to age for two hours at a temperature of about 140° F.

A quantity of a base gel is prepared by the proportionate admixing of 50 lb. hydroxypropylguar, 2.5 lb. fumaric acid, and 10 lb. sodium bicarbonate per 1,000 gallons of 2% potassium chloride solution. The base gel is prepared at a temperature of about 80° F.

A quantity of the aged composition is admixed with the base gel in a ratio of 1.5 gallons per 1,000 gallons of base gel. The admixture then is heated to a temperature of about 140° F. The gel is found to crosslink in about two hours.

EXAMPLE II

A retarded crosslinking composition is prepared in accordance with the present invention containing 91.25 gm. titanium-triethanolamine chelate, 98.0 gm. of a retarding agent comprising gluconic acid (50% solution in water) and 91.25 gm. of water. This composition is aged for about two hours at a temperature of about 140° F.

A base gel is prepared as in Example I. A quantity of the aged composition is admixed with the base gel in a ratio of 1.5 gallons per 1,000 gallons of base gel. The mixture then is heated to a temperature of about 140° F. The gel is found to crosslink in about twelve hours.

EXAMPLE III

A base gel is prepared by admixing 50 lb. of hydroxypropylguar, 2.5 lb. total acid (fumaric acid and retarding agent) and 10 lb. of sodium bicarbonate with 1,000 gallons of 2% potassium chloride solution. Portions of the base gel are admixed with a retarding agent in a Waring blender in the proportions set forth in Table I below. A crosslinking agent comprising titanium-triethanolamine diluted in a 1:1 ratio with water is admixed with the gel in the blender in a ratio of 1.0 gallon of crosslinking agent per 1,000 gallons of gel. The base gel then is admixed in the blender at a speed sufficient to form the maxiumum vortex achievable without air entrainment and the time required for complete closure of the vortex is measured. The time required for the vortex to close provides an indication of the time required to crosslink the base gel and is referred to hereafter as the "crosslink time". The time required for each portion is set forth in Table I, below.

TABLE I

| Crosslinking Time of Retarded Crosslinking Agent in Base Gel | |
|---|---|
| Retarding Agent, lb./1,000 Gal. Base Gel | Crosslinking Time, Seconds |
| 0 | 25 |
| 0.25 | 233 |
| 0.50 | 587 |
| 1.0 | >600 |
| 2.0 | >600 |

The base gel samples containing no retarding agent and 0.5 lbs. of retarding agent/1,000 gallons of gel then were transferred from the Waring blender to a Model 50 FANN Viscometer, and the apparent viscosity of the samples was determined. The gel was heated in the viscometer to a temperature of about 300° F. The results are set forth in Table II, below.

TABLE II

| Time-Temperature Stability of Gel | | |
|---|---|---|
| | Apparent Viscosity, cp at 170 sec$^{-1}$ | |
| Time at 300° F., Minutes | 0 lbs./1,000 gal. Retarding Agent | 0.5 lbs./1,000 gal. Retarding Agent |
| 0 | 170 | 420 |
| 15 | 155 | 455 |
| 30 | 145 | 392 |
| 45 | 135 | 348 |
| 60 | 125 | 284 |
| 75 | 117 | 240 |
| 90 | 110 | 197 |
| 105 | 102 | 161 |
| 120 | 95 | 130 |

The results of the tests clearly illustrate the effectiveness of the retarding agent in the practice of one method of the present invention.

While particular embodiments of the invention have been described, it is to be understood that such descriptions are presented for purposes of illustration only and that the invention is not limited thereto and that reasonable variations and modifications, which will be apparent to those skilled in the art, can be made without departing from the spirit or scope of the invention.

What is claimed is:

1. An aqueous gel comprising:
   an aqueous fluid comprising a water-alcohol solution having from about 0 to 80 percent alcohol by volume;
   a gelling agent comprising a solvatable polysaccharide having a molecular weight in excess of about 100,000 present in an amount sufficient to gel said aqueous fluid;
   a crosslinking agent soluble in said aqueous fluid comprising an organotitanate chelate present in an amount sufficient to crosslink at least a portion of said gelling agent; and
   a retarding agent comprising at least one member selected from the group consisting of malic acid, succinic acid, glucuronic acid, gluconic acid, ascorbic acid, alphaketo glutaric acid, and isoascorbic acid present in an amount sufficient to retard the action of said crosslinking agent upon said gelling agent.

2. The aqueous gel of claim 1 wherein said crosslinking agent comprises at least one member selected from the group consisting of titanium-triethanolamine chelate, and titanium-acetylacetonate chelate.

3. The aqueous gel of claim 1 wherein said crosslinking agent is present in an amount sufficient to provide a titanium ion concentration in said aqueous gel in the range of from about 0.0005 percent to in excess of about 0.01 percent by weight of said aqueous fluid.

4. A process for fracturing a subterranean formation which comprises:
   introducing into said formation an aqueous gel at a flow rate and pressure sufficient to produce a fracture in said formation, said aqueous gel being comprised of:
   an aqueous fluid comprising a water-alcohol solution having in a range of from about 0 to about 80 percent alcohol by volume,
   a gelling agent comprising a solvatable polysaccharide having a molecular weight in excess of about 100,000 present in an amount sufficient to gel said aqueous fluid;
   a crosslinking agent soluble in said aqueous fluid selected from organotitanate chelates having titanium in the +4 oxidation state present in an amount sufficient to crosslink at least a portion of said gelling agent; and
   a retarding agent comprising at least one member of the group consisting of malic acid, succinic acid, glucuronic acid, gluconic acid, ascorbic acid, alpha-keto glutaric acid, and isoascorbic acid, said retarding agent being present in an amount sufficient to retard the crosslinking rate of said gelling agent by said crosslinking agent.

5. The process of claim 4 wherein said gelling agent comprises solvatable polysaccharides selected from the group consisting of guar gum, locust bean gum, karaya gum, sodium carboxymethylguar, hydroxyethylguar, sodium carboxymethylhydroxyethylguar, hydroxypropylguar, and sodium carboxymethylhydroxypropylguar.

6. The process of claim 4 wherein said crosslinking agent comprises at least one member selected from the group consisting of titanium-triethanolamine chelate and titanium-acetylacetonate chelate.

7. The process of claim 4 wherein said gelling agent is present in said aqueous fluid in a concentration in the range of from about 0.2 to about 1.25 percent by weight of said aqueous fluid.

8. The process of claim 4 wherein said crosslinking agent is present in an amount sufficient to provide a titanium ion concentration in said aqueous gel in the range of from about 0.0005 to in excess of about 0.01 percent by weight of said aqueous fluid.

9. A process for hydraulically fracturing a subterranean formation penetrated by a well bore which comprises:
   preparing a base gel by mixing an aqueous fluid with a gelling agent selected from solvatable polysaccharides having a molecular weight of at least about 100,000, said gelling agent being present in an amount sufficient to gel said aqueous fluid;
   admixing a retarding agent with said base gel, said retarding agent being present in an amount sufficient to delay the reaction rate of said gelling agent of said base gel with a selected crosslinking agent, said retarding agent comprising at least one member selected from the group consisting of malic acid, succinic acid, glucuronic acid, gluconic acid, ascorbic acid, alpha-keto glutaric acid and isoascorbic acid;
   introducing said base gel containing said retarding agent into said well bore in admixture with said selected crosslinking agent which comprises an organotitanate chelate having titanium in the +4 oxidation state and which is soluble in said aqueous fluid;
   permitting said base gel and said crosslinking agent to react after a controllable period of time to form a crosslinked aqueous gel, at least a portion of the delay in the rate of said reaction resulting from the presence of said retarding agent; and
   introducing said crosslinked aqueous gel into said formation from said well bore at a flow rate and pressure sufficient to produce a fracture in said formation.

10. The process of claim 9 wherein said gelling agent comprises solvatable polysaccharides selected from the group consisting of guar gum, locust bean gum, karaya gum, sodium carboxymethylguar, hydroxyethylguar, sodium carboxymethylhydroxyethylguar, hydroxypropylguar, and sodium carboxymethylhydroxypropylguar.

11. The process of claim 9 wherein said crosslinking agent comprises at least one member selected from the group consisting of titanium-triethanolamine chelate and titanium-acetylacetonate chelate.

12. The process of claim 9 wherein said crosslinking agent is present in an amount sufficient to provide a titanium ion concentration in said aqueous gel in the range of from about 0.0005 to in excess of about 0.01 percent by weight of said aqueous fluid.

13. The process of claim 9 wherein said retarding agent is admixed simultaneously with said mixing of said gelling agent with said aqueous fluid.

14. A process for hydraulically fracturing a subterranean formation penetrated by a well bore which comprises:

preparing a base gel by mixing an aqueous fluid with a gelling agent selected from solvatable polysaccharides having a molecular weight of at least about 100,000, said gelling agent being present in an amount sufficient to gel said aqueous fluid;

admixing a retarded crosslinking composition comprising:
(i) a crosslinking agent soluble in said aqueous fluid comprising an organotitanate chelate having titanium in the +4 oxidation state,
(ii) a retarding agent comprising at least one member selected from the group consisting of citric acid, malic acid, succinic acid, tartaric acid, glucuronic acid, gluconic acid, ascorbic acid, alpha-keto glutaric acid and isoascorbic acid; and
(iii) an aqueous fluid present in said retarded crosslinking composition in a volumetric ratio, respectively, in the range of from about 1:0.05:0.05 to about 1:10:10 with said base gel, said retarded crosslinking composition being present in an amount sufficient to delay the reaction rate of said crosslinking agent with said gelling agent of said base gel said retarded crosslinking composition being aged for from a few minutes to about four weeks prior to admixing with said base gel;

introducing said base gel containing said retarded crosslinking composition into said well bore;

permitting said base gel and said crosslinking agent to react after a controllable period of time to form a crosslinked aqueous gel, at least a portion of the delay in the rate of said reaction resulting from the presence of said retarding agent and aqueous fluid in said retarded crosslinking composition; and introducing said crosslinked aqueous gel into said formation from said well bore at a flow rate and pressure sufficient to produce a fracture in said formation.

15. The process of claim 14 wherein said gelling agent comprises solvatable polysaccharides selected from the group consisting of guar gum, locust bean gum, karaya gum, sodium carboxymethylguar, hydroxyethylguar, sodium carboxymethylhydroxyethylguar, hydroxypropylguar, and sodium carboxymethylhydroxypropylguar.

16. The process of claim 14 wherein said crosslinking compound comprises at least one member selected from the group consisting of titanium-triethanolamine chelate and titanium-acetylacetonate chelate.

17. The process of claim 14 wherein said crosslinking agent, retarding agent and aqueous fluid of said retarded crosslinking composition are present in a ratio, respectively, in the range of from about 1:0.1:0.1 to about 1:4:4.

18. The process of claim 14 wherein said retarded crosslinking composition is aged for a period of from about 2 to about 4 weeks at 80° F.

* * * * *